Feb. 13, 1945.   E. ST. JOHN   2,369,418
APPARATUS FOR USE IN TEACHING AND TRAINING AVIATORS
Filed April 24, 1943   5 Sheets-Sheet 1
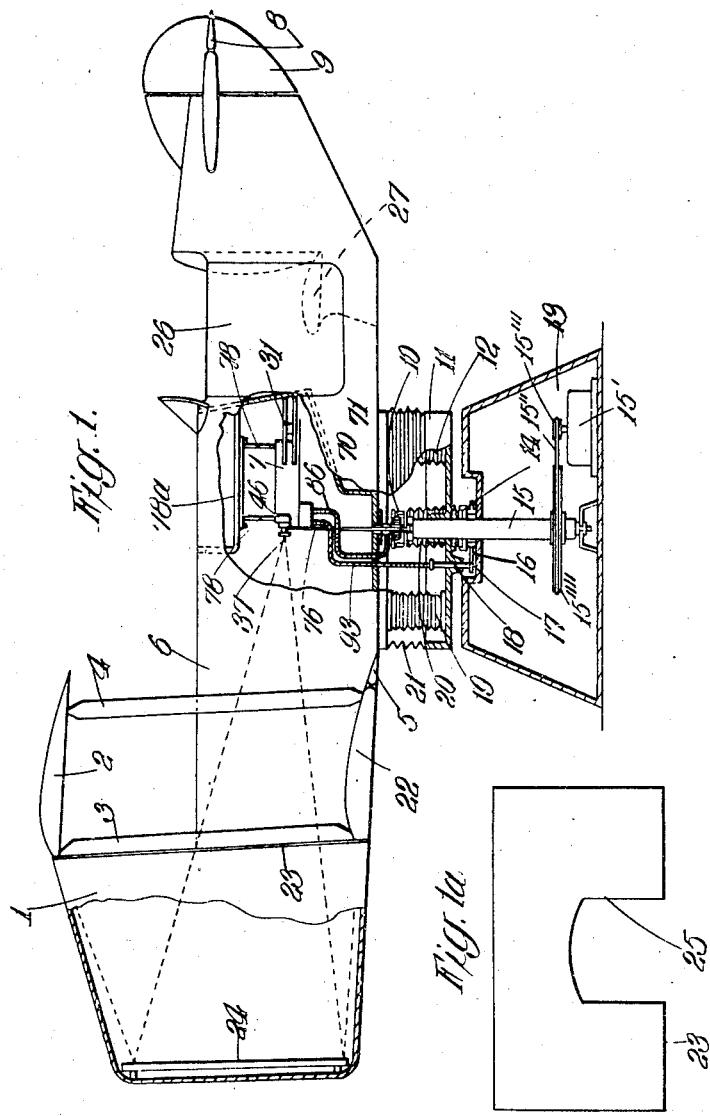
ERIC ST. JOHN
INVENTOR
By Otto Munk
his ATT'Y.

Feb. 13, 1945.    E. ST. JOHN    2,369,418
APPARATUS FOR USE IN TEACHING AND TRAINING AVIATORS
Filed April 24, 1943    5 Sheets-Sheet 2
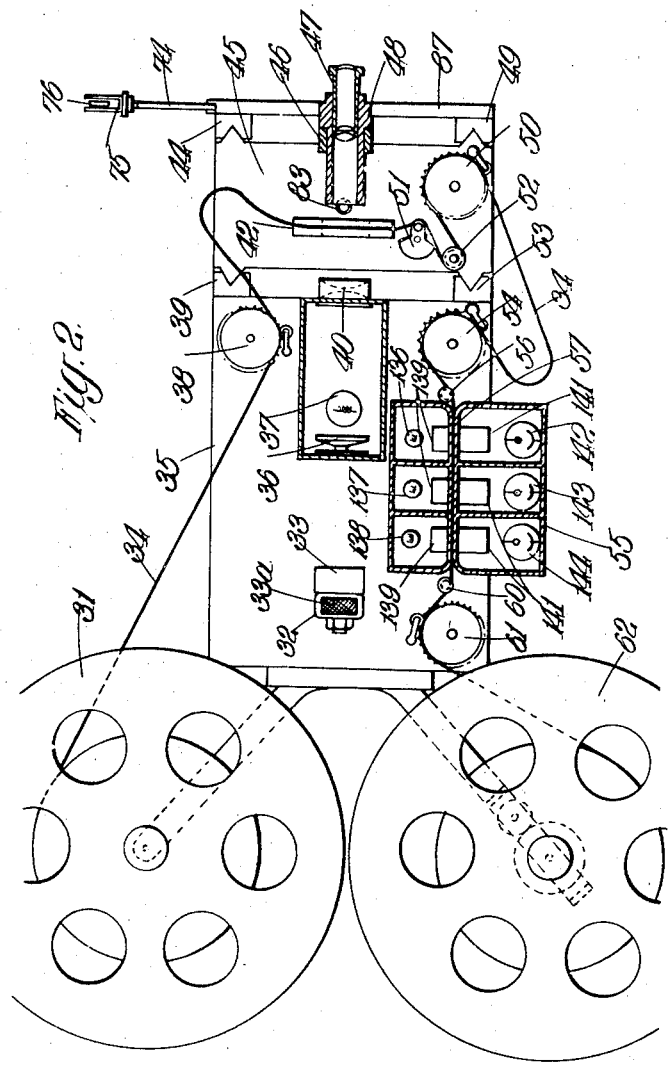
ERIC ST. JOHN
INVENTOR

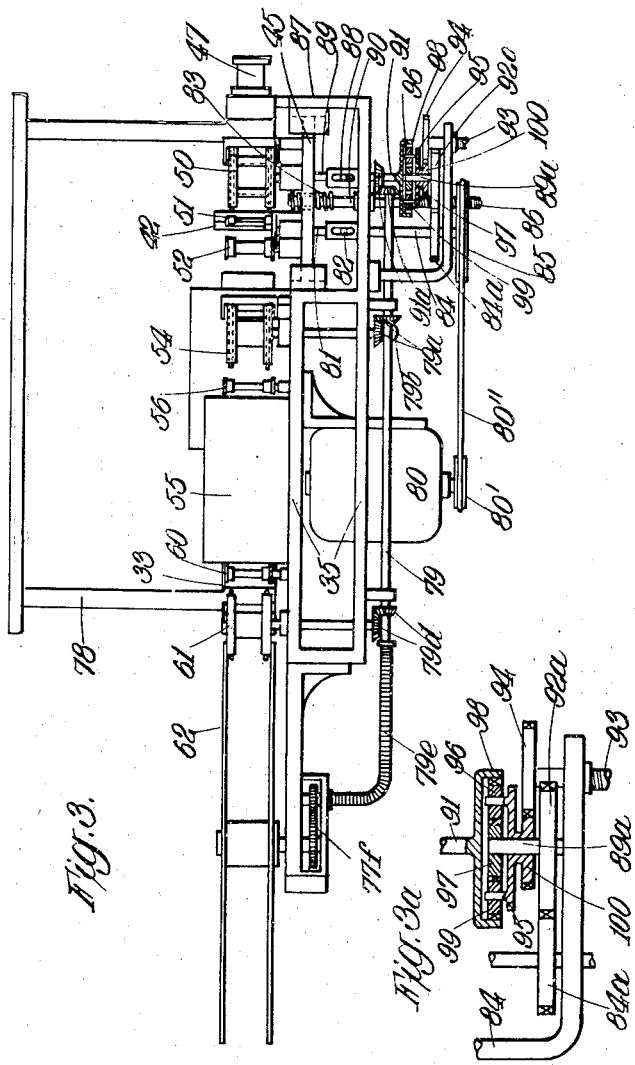

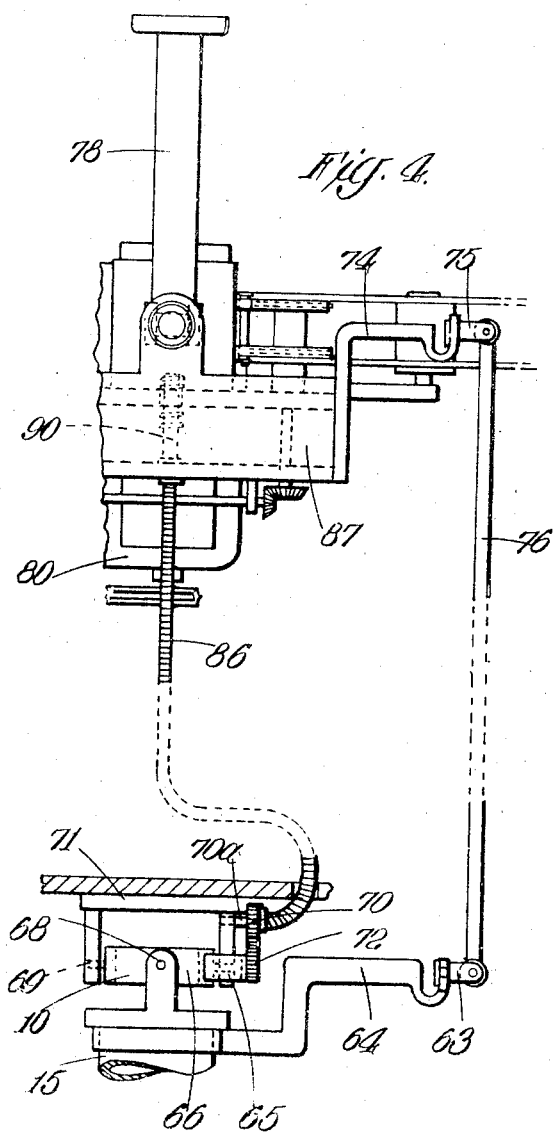

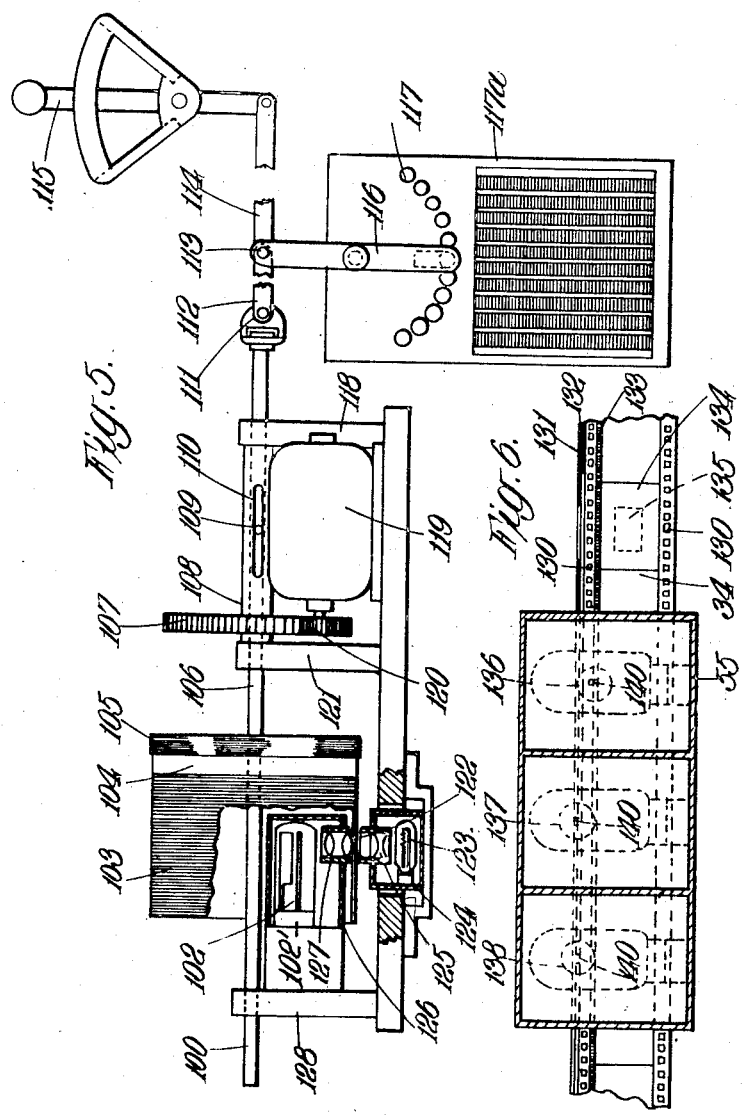

Patented Feb. 13, 1945

2,369,418

UNITED STATES PATENT OFFICE 2,369,418

APPARATUS FOR USE IN TEACHING AND TRAINING AVIATORS

Eric St. John, Cardiff, Wales

Application April 24, 1943, Serial No. 484,337
In Great Britain April 24, 1941

7 Claims. (Cl. 35—12)

This invention relates to apparatus for use in teaching and training aviators or as an amusement device.

Two fundamental objects which are the concern of a pupil undergoing instruction in the control and operation of a simple aircraft under normal conditions are (i) the assimilation by the pupil of a sound knowledge of the working and effect of the various controls provided and (ii) the use of the earth's natural horizon as a guide to the attitude and direction of the aircraft under control.

At the present time it is usual when training aviators in the elementary phases of flying, to provide a dummy fuselage which is mounted on a support in such a way as to enable it to be moved into positions corresponding to a large extent with those which are obtained in the case of an actual aircraft in flight. The dummy fuselage is fitted with the usual control surfaces and contains a cockpit in which the pupil is seated. A set of normal aeroplane controls is provided in the cockpit and when operated by the pupil cause the dummy fuselage to assume, within predetermined limits, attitudes corresponding to those which a normal aircraft assumes when its controls are operated in a similar manner.

At a suitable distance from the fuselage is an arcuate screen, bearing upon its interior surface a printed or painted representation of a landscape and natural horizon as would be seen by the pilot of an aeroplane flying at certain fixed altitudes.

This arrangement, although satisfactory with regard to instruction and practice in the first of the two main objects above referred to, has a very limited use with regard to the second object. During the operation of an aircraft within a predetermined distance from the ground, i. e. during the important manoeuvres of taking-off and landing, a prime consideration is the forward speed of the aircraft, and as the existing training system described has no method of representing a visual indication of forward motion, it can offer little or no assistance to the pupil in practising taking-off and landing.

Above a predetermined distance from the ground the apparent forward speed of an aircraft relative to the earth is small and is, for the purpose of such ground training, ignored.

It is a main object of the present invention to provide an apparatus which simulates more realistically the appearance of a natural horizon and landscape substantially as would be seen by the pilot of an aircraft throughout all phases of a complete instructional or operational flight from taking-off, climbing to a high altitude, executing manoeuvres, and landing, thus permitting a wider range of ground instruction.

A further object of the present invention is to provide means whereby progressive instructional exercises, with attendant oral explanations, may be presented to the pupil under training without the assistance of an instructor, and to increase the realism obtained by providing means whereby correct engine sounds in relation to various settings of the throttle control may be heard by the pupil.

A further object of the invention is to provide, in association with the automatic instructional exercises already referred to and for the purpose of extending the scope thereof, means whereby the normal operation of the apparatus and/or its response to movement of the controls may be influenced in such a way as to simulate the changed behaviour and/or response to controls that a real aircraft would have when operated under predetermined changed conditions, such as flying in rough air, in varying combinations of wind strength and direction, and during flight without engine power (for use in forced landing practice).

According to the present invention an apparatus, for use in teaching and training aviators or as an amusement device, and including a dummy fuselage with a cockpit for accommodating a pupil or other person, the fuselage being provided with a set of normal controls, and being capable of being tilted or turned, is provided with a cinematographic projector mounted in the fuselage for projecting a scenic picture on a screen mounted in such a position in the fuselage as to be visible to the occupant of the cockpit in all positions of the fuselage, the projector being mounted in the fuselage in such a manner that the scenery projected on to the screen always has its horizon apparently fixed in space irrespective of the position of the aircraft.

On to the screen are projected cinematographic pictures depicting views as would be seen by the pilot of a real aircraft.

The cinematographic projector is so constructed that its film feed mechanism may be operatively associated with the controls in the cockpit, so that as the controls are operated, the scenery visible on the screen is influenced in a manner as to represent such visual changes as would be seen by the pilot of a real aircraft.

The scenery may depict the correct views as would be seen during all phases of a flight and in correct sequence and various films may be used in order to obtain such widely varying operational conditions as flare path landings by night, operations conducted from the sea or from a marine aircraft carrier.

Oral explanations associated with various manoeuvres may be heard through headphones worn by the occupant of the cockpit and are derived from a sound track of an instructor's voice recorded on the cinematographic film. Engine sounds derived from optically recorded sound tracks are recorded on a separate drum in the form of progressive engine sound tracks, means being provided whereby movement of a dummy throttle control lever in the cockpit causes the appropriate sound track to be selected and heard by the pupil through headphones.

A series of control tracks optically recorded on the cinematographic film provide means whereby electromagnetic switches are operated, so as to produce additional movements simulating extraneous influences on the fuselage.

The invention will now be described by way of example with reference to the accompanying drawings, wherein:

Fig. 1 is a side elevation, partly in section, of a dummy fuselage mounted on a support, Fig. 1a shows an elevation of a projection screen, Fig. 2 shows a plan view, partly in section, of a projector, Fig. 3 is a side view of Fig. 2, Fig. 3a shows sun and planet mechanism to a larger scale.

Fig. 4 is a partial view looking on the right hand end of Fig. 3,

Fig. 5 shows an elevation, partly in section, of an arrangement for controlling the speed of the projection motor and the arrangement for driving and adjusting a drum on which engine sounds have been recorded optically, and Fig. 6 shows a film and a scanning device through which the film passes.

Referring first to Fig. 1 a dummy fuselage 6 is provided with ailerons 5, a rudder 9, elevators 8 and with a cockpit 26 containing the usual controls, which are not shown.

The fuselage 6 is mounted on a vertical supporting shaft or spindle 15, between the top of which and the fuselage is located a universal joint 10 which provides for a predetermined amount of movement of the fuselage 6 in "looping" and "rolling" planes. The vertical shaft 15 is mounted in anti-friction bearings 14, supported by a fixed base 13, so as to allow the vertical shaft 15 and thus the fuselage 6 free rotation in the "yawing" plane.

Movement of the fuselage, under the action of the controls, may be effected by hydraulic pressure, electric motors and gearing, or by the variation of air pressure in a number of supporting bellows mounted between the fuselage 6 and a base plate 11, with an upstanding rim, keyed to the shaft 15. The bellows arrangement is for example as described in U. S. Patent No. 1,825,462 issued Sept. 29, 1931. With a bellows arrangement movement of the fuselage in the "rolling" plane is effected by operating air valves, on the bellows, which are connected to an appropriate control in the cockpit 26 so as to vary the air pressure in two bellows 20 arranged underneath the fuselage 6, one on each side of the longitudinal axis thereof.

Movement of the fuselage in the "looping" plane is effected by operating air valves connected to an appropriate control in the cockpit 26 so as to vary the air pressure in two bellows 19, 12 located underneath the fuselage 6 along the longitudinal centre line of the fuselage 6, the bellows 19 being in front of the shaft 15 and the bellows 12 behind the shaft 15. The bellows 19, 12 are supported by the plate 11 and enclosed in a flexible casing 21.

Movement of the fuselage in the "yawing" plane, i. e. turning, is effected by means of a vacuum operated motor 15' which drives the shaft 15 through suitable gearing such as a belt 15" and pulleys 15''', 15''''. This motor is controlled from the cockpit 26.

The various movements of the fuselage may be effected independently of one another or simultaneously.

A projection screen 23 is mounted in any suitable manner at the forward end of the nose of the fuselage 6. In the case of a biplane as shown the screen 23 is secured to the leading edges of top and bottom main planes 2, 22 and to the leading edges of a pair of front interplane struts 3 located in suitable spaced relation on opposite sides of the nose of the fuselage 6.

A cinematograph projector 7 is mounted in a suitable position inside the fuselage 6 so that the beam therefrom passes forwardly along the inside of the fuselage 6 and out through the open front of the nose of the fuselage 6, where the screen 23 is provided with a cut-away portion 25 (Fig. 1a) which fits around the nose tip. In order to obtain a long throw between the projector 7 and the screen 23, a reflecting surface 24 is carried in a suitable frame work 1, extending forwardly from the fuselage 6, this reflecting surface 24 being set at a suitable angle so that it reflects the beam from the projector 7 on to the rear of the screen 23.

The screen 23 is constructed of a suitable translucent material and, as will be seen in Fig. 1, is so positioned that images projected thereon can be viewed by the occupant of a seat 27 in the cockpit 26.

As shown in Fig. 2 the projector 7 is, in many respects, of similar construction to a normal cinematographic projector. It is provided with a film feed spool 31, a feed sprocket 38, a film gate 42 through which a film 34 is passed between a light source 37, which is located between a reflector 36, and a condenser lens 40, and a projection lens system 47. The film gate 42 is provided with front and back metal plates each provided with an oblong hole forming the gate mask aperture.

A feed member 51, of the "beater" type serves to produce intermittent movement of the film 34 which, after leaving the beater 51, passes around a guide roller 52, then around a first take-up sprocket wheel 50. The film 34 then passes around a sprocket wheel 54 from which it passes around a guide roller 56, through a second film gate 57 of a sound and control track scanning system 55.

When the film 34 leaves the system 55 it passes around a guide roller 60, to a final take up sprocket 61 and on to a take-up spool 62.

A suitable rotary intermittent shutter is provided but this is not shown in Fig. 2 for the sake of clearness.

The projector 7 with its base plate 35 is mounted in the horizontal position so that the film 34 passes through the gate 42 horizontally instead of vertically as in the case of normal projectors.

As the images are arranged side by side along the length of the film a larger individual frame area can be obtained than when the images are arranged one above another.

For the purpose of driving the projector 7 an electric motor 80 is mounted on the underside of the base plate 35. The motor 80, through a pulley 80', and a belt 80'' drives a pulley 85 keyed to the lower end of a shaft 84 directly driving the beater 51. From the shaft 84 the drive is transmitted through the gear wheels 84a, 92a to a shaft 89a which through sun and planet gearing 97, 96, 99, 98 drives a shaft 91 directly driving the sprocket wheel 50. The shaft 91 drives through bevel wheels 91a a main shaft 79 which through bevel wheels 79a drives a vertical shaft on which the sprocket wheel 54 is keyed, and a horizontal shaft 79b which, through bevel wheels, drives a vertical shaft on which the sprocket wheel 38 is keyed. The shaft 79 also drives, through bevel wheels 79d, a vertical shaft to which the sprocket wheel 61 is keyed. A flexible extension 79e drives the take-up spool 62 through frictional reduction gear 77f.

As the screen 23 is attached to the fuselage 6 and consequently moves therewith a scene projected by a fixed projector 7 would remain in a fixed position on the screen 23. This would be unsuitable for the purpose of the present invention as the projected "horizon" must not tilt or alter its apparent position in space, whatever attitude the fuselage 6 may assume. It is therefore necessary to mount the projector 7 in the fuselage 6 in such a manner that the "horizon" remains stationary no matter what tilted position is assumed by the fuselage 6.

In order to obtain this result the projector 7 is pivotally mounted at opposite ends of its longitudinal axis in bearings 46, 32 in a frame 78 secured to a suitable support 78a provided for the purpose in the fuselage 6.

The front bearing 46 houses a tube 48 in which the lens system 47 is mounted and to which is attached a front upward extension 87 in the base plate 35.

The rear bearing 32 houses a bolt 33a projecting from a bracket 33 secured to the base plate 35. An arm 74 extending laterally from the front extension 87 of the base plate 35 is connected by a swivel coupling 75 to a link 76 of which the lower end is connected by a swivel coupling 63 to an arm 64 rigidly attached to the shaft 15.

When the fuselage 6 moves in the "rolling" plane the projector 7 is also displaced about a centre coinciding with the axis of the pintle bearings 68 of the universal joint 10 but is retained in the horizontal position by the link 76. The swivel couplings 75—63, which connect the upper and lower ends of the link 76 to the arms 74, 64, however, allow unrestricted movement of the projector 7 about a centre coinciding with the axis of the pintle bearings 69 when the fuselage 6 moves in the "looping" plane.

When the fuselage 6 is moved in the "looping" plane, i. e. raises or lowers its nose, the projector 7 and screen 23 moving in the same plane would normally cause the projected horizon to rise or fall with respect to the earth.

To counteract this some of the parts of the projector 7 are mounted on a separate plate 45 in order that a proportionate vertical movement may be imparted thereto.

For this purpose the film gate 42, the beater 51, the guide roller 52 and the take-up sprocket 50 are mounted on the separate plate 45. The four corners of this plate 45 are shaped so as to slide in V-grooves formed in guide blocks 39, 44, 49 and 53 secured to the main base plate 35.

A vertical shaft 90 passing through and free to rotate in the main base plate 35 is provided at its upper end with a screw thread 83 engaging with a corresponding thread in the separate plate 45.

The lower end of the shaft 90 is connected to a flexible shaft 86 to the free end of which is secured a pinion 70 rotating freely on a spindle 70a extending laterally from a bracket 71 forming the upper part of the universal joint 10 on which the fuselage 6 is mounted. The pinion 70 gears with a fixed gear wheel 72 mounted on a bracket 65 attached to the intermediate circular member 66 of the universal joint 10. During movement of the fuselage 6 in the "looping" plane, i. e. about a centre coinciding with the axis of the pintle bearing 69, the fixed wheel 72 remains stationary whilst the pinion 70 runs thereon thus rotating the flexible shaft 86 and consequently also the shaft 90 so that the plate 45 is raised or lowered by reason of the screw thread 83 (Fig. 3) turning therein.

The pitch of the teeth of the wheels 70, 72 is so chosen that the raising and lowering of the plate 45 is in the correct relation to the angle of tilting of the fuselage about the axis of the bearings 69.

In order that the film 34 may not be damaged during this movement loops are provided in the film 34 between the sprocket 38 and the gate 42 and between the sprockets 50 and 54.

To allow the plate 45 to be raised and lowered shafts 81, 89 with tubular portions are fitted on the upper ends of the shafts 84, 91 to which they are secured by pin and slot connections 82, 88.

When the fuselage 6 moves in the "yawing" plane, i. e. swings its nose to the right or left, any fixed point in the projected horizon must remain stationary relatively to the earth. For this purpose the gear ratio of the drive common to the sprockets 38, 50, 54, 61 is varied as hereinafter described whilst the drive of the beater 51 is driven at a constant speed. As above described the beater 51 is driven from the shaft 81, whilst the sprockets are driven through the sun and planet gearing. For varying the gear ratio of the drive to the sprockets 38, 50, 54, 61 a drive is transmitted from the shaft 89a (Fig. 3a) to the planet wheels 96, 99 through the sun wheel 97. The planet wheels 96, 99 drive the flange 98, whilst a cross arm 95, on which the planet wheels 96, 99 are mounted, remains stationary when the fuselage is in the normal position and the gear ratio is thus constant. When "yawing" movement occurs, the cross arm 95 is caused to rotate, and the planet wheels 96, 99 move around the periphery of the sun wheel 97 so that the velocity ratio of the sprockets is increased or reduced according to the direction of rotation of the cross arm 95. Thus while the beater 51, of which the speed of rotation remains constant, causes the film 34 to be moved through the gate 52 at constant intervals and then to remain stationary whilst the picture is projected, any increase or decrease in the speed of rotation of the sprockets causes a greater or shorter portion of the film to be fed by the beater, the result of which is to produce on the screen a lateral movement of the picture to left or right.

The cross arm 95, which is freely rotated about the shaft 89a, is secured to a toothed wheel 100, also freely rotatable about the shaft 89a and gearing with a toothed wheel 94 secured to a flexible shaft 93.

The lower end of the flexible shaft 93 is secured to a spindle 18 (Fig. 1) passing freely through the plate 11 and provided at its lower end with a pinion 17 gearing with a sun wheel 16 secured to the non-rotatable support 13.

In order to control the apparent flying speed of the aircraft relatively to the projected scenery the driving speed of the motor 80 is varied by controlling an electrical resistance arranged in series with the motor 80.

As shown in Fig. 5 a link 114 is connected at one end to the lower end of a dummy throttle control lever 115 pivotally mounted in the cockpit 26.

The other end of the link 114 is connected to one end of a pivoted selector arm or finger 116 so that movement of the control lever 115 results in a proportionate movement of the arm 116 sliding over contact studs 117 of a resistance located in a box 117a. The effective range of the resistance is such that its maximum value corresponds with the closed portion of an engine throttle, whilst its minimum value corresponds with a fully open throttle.

In order to obtain sounds corresponding with various settings of the dummy throttle lever 115 there is provided a drum consisting of an end plate 105 to which is secured a transparent cylinder 104 provided on its outer surface with a series of optically recorded sound tracks 103.

The separate sound tracks 103 are endless and each represents the sound of an aero engine running at a particular speed. The tracks 103 are arranged side by side in progressive order so as to cover substantially a complete range of sounds at different engine speeds.

An exciter lamp 123 is mounted in a housing 124 located below the cylinder 104. Opposite the lamp 123 the housing 124 is provided with a condenser lens system 125 at the outer end of which is a cover plate 122 provided with a scanning slot. This slot is of a width equal to an individual sound track 103 so that the rays from the lamp 123 only traverse the sound track 103 which is in register with the slot at any particular moment. The rays from the lamp 123 impinge upon a photo-electric cell 102, located inside the cylinder 104 through a lens system 127, the cell 102 being shielded by a housing 126 secured to a fixed support 128.

In order to select the appropriate sound track 103, corresponding to a particular position of the lever 115 the drum 104, 105 is mounted on a shaft 106, which is rotatably mounted in supports 128, 121, 118 and of which one end is connected by a swivel joint 111 to a link 112. This link 112 is connected by a hinge pin 113 to the link 114 and lever 116.

When the lever 115 is actuated to control the resistance lever 116 it thus also moves the shaft 106 longitudinally in the supports 128, 121, 118. This longitudinal movement of the shaft 106 is limited by a slot 110, in a sleeve 108 fitted around the shaft 106 between the supports 121, 118, with which engages a pin 109 secured to the shaft 106.

For the purpose of rotating the cylinder 104 there is provided a synchronous electric motor 119 which drives the cylinder 104 through suitable reduction which as shown in Figure 5 consists of a pinion 120 keyed to the motor shaft, gearing with a toothed wheel 107 keyed to the sleeve 108.

The photo-electric cell 102 is connected by a suitable amplifier 102' to earphones worn by a pupil or other occupant of the seat 27 in the cockpit 26.

As shown in Figure 6 the film 34 is provided with perforations 130, similar to an ordinary cinematographic film. The images, as above described, are arranged side by side and are photographed by means of a wide angle lens so that when projected each frame 134 covers substantially a larger field of view than the area 135 necessary for fitting the projection screen 23. As a result the screen 23 is always covered with a complete picture irrespective of the position of the fuselage 6.

Between the images 134 and one row of perforations 130 is provided an optically recorded sound track 133 similar to that on a normal sound film. At the edge of the film 34 beyond the perforations 130 are provided two further optically recorded control tracks 131, 132, one of these tracks serving to control, through suitable amplifiers, electro-magnetic relays for actuating the additional valves on the bellows 12, 19 and the other relays for actuating the additional valves of the bellows 20.

The tracks 131, 132 may be located on the opposite side of the film 34 to the track 133.

The track 133 carries recorded instructions or explanations given by an instructor. As will be appreciated these recordings are only practical when the film 34 passes through the gate 57 of the scanning device 55 at a constant speed. When the film 34 passes through the scanning device 55 the sound and control tracks 133, 131, 132 are scanned by light rays from a series of exciter lamps 136, 137, 138. The rays pass through condenser systems 139 and through the tracks 133, 131, 132, opposite which are located slits 140 cut in the gate 57. After leaving the tracks the rays pass through collector lens systems 141 and impinge upon photo-electric cells 142, 143, 144.

The photo-electric cell 142 is connected through a suitable amplifier to the earphones worn by the pupil or other person in the cockpit 26.

By the operation of these valves mechanical effects can be introduced upon the operation of the apparatus in order to simulate actual flying or operating conditions as occur due to wind and other forces.

A stereoscopic film may be used so as to obtain greater realism of flying. In such a case the occupant is provided with a suitable viewing device.

The scenery projected on to the screen is preferably previously photographed from an aircraft in flight. The images may be arranged one above the other on the projector film as on usual films, in which case the projector is arranged vertically. For the reasons stated above it is however preferred to arrange the images side by side and to use the projector in a horizontal position.

Instead of the "beater" type of feed mechanism, there may be used a maltese cross device, a claw mechanism or other well known intermittent feed device for the film.

The film is preferably of the 35 mm. type, whilst the field of the lens system 47 is preferably such as to extend over only a portion of a film image.

In use the operation of the apparatus above described is is follows:

A pupil or other person when seated in the cockpit 28 fits on the headphones and closes a main switch whereby the motors 80 and 119 are set in operation. The projector 7 projects on to the screen 23 a suitable picture such as a picture of a flying ground as would be seen from the cockpit of a stationary aircraft. The pupil may then be instructed to go through the normal starting procedure in response to oral instructions such as given by an instructor. The pupil hears the engine running and is ready to take off. The directon of the wind may be seen from a wind direction indicator located at a distance.

During flight the pupil receives the recorded instructions through the earphones as though in radio communication with an instructor in a separate plane which may appear on the screen.

On the screen the instructor's plane will for example appear to take-off, climb, execute any manoeuvres within the mechanical scope of the apparatus, approach an aerodrome and land, these being operations which the pupil is required to follow in the apparatus. The pupil will naturally lag behind a few seconds.

As an example of the operation of the special bias effects, should the pupil notice before taking-off that the wind direction was indicated as being across his flight path, he will realize that it will be necessary to counteract the resulting influence on his machine. For example, one effect of taking-off across wind is that owing to the effect of the wind on the keel surface, the nose of an aeroplane tends to turn into wind during take-off and thus the pilot is required to operate the rudder to offset this effect. An appropriate transparent portion of a control track having permitted the exciter lamps rays to actuate the relevant photoelectric cell, the appropriate air suction valve is caused to operate as previously described and the trainer commences to turn. In order to keep his aeroplane heading in the right direction for take-off the pupil must apply the opposite rudder and thus balance the apparent effect of the cross wind.

It can be seen that this device may be used to obtain many different combinations of bias effects in conjunction with suitable flight sequences and may also be used to influence the mechanical operation of the apparatus in order to simulate various types of aircraft.

The invention is readily adaptable to any type of aircraft and may be built on a larger scale if desired in order to accommodate a pupil and instructor with interconnected controls.

I claim:

1. In an apparatus for the purpose described the combination comprising a fixed base, a vertical shaft rotatably mounted in said base, a dummy fuselage mounted on said vertical shaft, a universal joint between said vertical shaft and said fuselage, means for producing movements of said fuselage in "looping," "rolling" and "yawing" planes, a cinematographic projector pivotally mounted in said fuselage about an axis parallel to the longitudinal axis of said fuselage, and linkage between said projector and said vertical shaft, said linkage serving to maintain said projector in a substantially horizontal position irrespective of any lateral tilting of the said fuselage.

2. In apparatus according to claim 1, a base plate on which said projector is mounted, said linkage including an arm extending laterally from said base plate, an arm attached rigidly to said vertical shaft, a link extending between said arms, and a pair of swivelling couplings connecting the opposite ends of said link to said arms.

3. In apparatus according to claim 1, a base plate on which said projector is mounted, said base plate consisting of two parts, one of said parts being capable of being raised and lowered relatively to the other, said projector including a light source, a reflector, a condenser lens, a film gate, a projection lens system, a feed sprocket, a beater, a guide roller, a first take-up sprocket and a second take-up sprocket, the film gate, the beater, the guide roller and the first take-up sprocket being mounted on the movable part of said base, and the light source, reflector, condenser lens, feed sprocket, the projector lens system and second take-up sprocket being mounted on the other part of said base plate, said movable part of said base having a screw threaded hole therein, a vertical shaft having a screw threaded portion at the upper end thereof, said screw threaded portion engaging said screw threaded hole, a flexible shaft connected to the lower end of said screw threaded shaft, a pinion secured to the free end of said shaft connected to said universal joint, said fixed gear wheel being engaged by said pinion, the arrangement serving to raise or lower the movable part of said base according to the vertical movement of the nose of the fuselage when the latter moves in a "looping" plane.

4. In apparatus according to claim 1, a base plate on which said projector is mounted, said base plate consisting of two parts, one of said parts being capable of being raised and lowered relatively to the other, said projector including a light source, a reflector, a condenser lens, a film gate, a projection lens system, a feed sprocket, a beater, a guide roller, a first take-up sprocket, and a second take-up sprocket, the film gate, the beater, the guide roller and the first take-up sprocket being mounted on the movable part of said base, and the light source, reflector, condenser lens, feed sprocket, the projector lens system, and second take-up sprocket being mounted on the other part of said base plate, guide blocks on said other part, said guide blocks each having a V-groove therein, said movable part having the corners thereof shaped so as to slide in said V-grooves, said movable part of said base having a screw threaded hole therein, a vertical shaft having a screw threaded portion at the upper end thereof, said screw threaded portion engaging said screw threaded hole, a flexible shaft connected to the lower end of said screw threaded shaft, a pinion secured to the free end of said shaft, and a fixed gear wheel connected to said universal joint, said fixed gear wheel being engaged by said pinion, the arrangement serving to raise or lower the movable part of said base according to the vertical movement of the nose of the fuselage when the latter moves in a "looping" plane.

5. In apparatus according to claim 1, a base plate on which said projector is mounted, said projector including a light source, a reflector, a condenser lens, a film gate, a projection lens system, a feed sprocket, a beater, a guide roller, a first take-up sprocket and a second take-up sprocket, means for driving said beater at a constant speed, driving mechanism for said sprockets, and means for varying the speed of movement of said sprockets relatively to the speed of said beater when said fuselage moves in a "yawing plane," said means comprising a sun wheel secured to said fixed support, a pinion gearing with said sun wheel, a flexible shaft to one end of which said pinion is keyed, a pinion secured to the other end of said flexible shaft, a main driving shaft, supplementary shafts, bevel gearing between said supplementary shafts and said main driving shaft, said main driving shaft and some of said supplementary shafts having said sprockets operatively connected thereto, an internally toothed flange keyed to said main driving shaft, an auxiliary shaft co-axial with said main driving shaft means for driving said auxiliary shaft, a sun wheel keyed auxiliary shaft, a toothed wheel freely rotatable on said auxiliary shaft and meshing with the toothed wheel at the other end of said flexible shaft, a cross arm secured to the toothed wheel freely rotatable on the auxiliary shaft and a pair of planet wheels rotatably mounted on said cross arm, said planet wheels gearing with said sun wheel and said flange.

6. In apparatus according to claim 1, a base plate on which said projector is mounted, said projector including a light source, a reflector, a condenser lens, a film gate, a projection lens system, a feed sprocket, a beater, a guide roller, a first take-up sprocket and a second take-up sprocket, means for driving said beater at a constant speed, driving mechanism for said sprockets, and means for varying the speed of movement of said sprockets relatively to the speed of said beater when said fuselage moves in a "yawing plane," said means for normally driving said sprockets at a constant speed relatively to said beater, and means for varying the speed of said sprockets relatively to the speed of said beater according to the movement of said fuselage in the "yawing" plane, said last mentioned means including differential gearing incorporated in said first mentioned driving means, and a flexible shaft connecting said differential gearing to said fixed support.

7. In apparatus for the purpose described the combination comprising a fixed support, a vertical shaft rotatably mounted in said support, a dummy fuselage mounted on said shaft, said fuselage being mounted rotatably and universally upon a vertical axis whereby said fuselage may move in "rolling," "looping" and "yawing" planes, a cinematographic projector mounted in said fuselage and capable of rocking about a horizontal axis parallel to the longitudinal axis of said fuselage, when in the normal position, and a linkage connecting said projector to said vertical shaft, the arrangement being such that a vertical plane passing through the longitudinal axis of the projector is parallel to the vertical axis of the shaft in all positions of the fuselage.

ERIC ST. JOHN.